(12) United States Patent
Kamamoto

(10) Patent No.: US 11,715,073 B2
(45) Date of Patent: Aug. 1, 2023

(54) INFORMATION PROCESSING APPARATUS AND INFORMATION PROCESSING METHOD OF INFORMATION PROCESSING APPARATUS

(71) Applicant: TOSHIBA TEC KABUSHIKI KAISHA, Tokyo (JP)

(72) Inventor: Shunichiro Kamamoto, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 225 days.

(21) Appl. No.: 17/131,921

(22) Filed: Dec. 23, 2020

(65) Prior Publication Data

US 2021/0304154 A1    Sep. 30, 2021

(30) Foreign Application Priority Data

Mar. 24, 2020   (JP) .................................. 2020-053069

(51) Int. Cl.
| | |
|---|---|
| *G06Q 10/00* | (2023.01) |
| *G06Q 10/06* | (2023.01) |
| *G06Q 10/20* | (2023.01) |
| *G06Q 10/0631* | (2023.01) |

(52) U.S. Cl.
CPC ....... *G06Q 10/20* (2013.01); *G06Q 10/06316* (2013.01); *G06Q 10/063112* (2013.01); *G06Q 10/063114* (2013.01)

(58) Field of Classification Search
CPC .......... G06Q 10/20; G06Q 10/063112; G06Q 10/063114; G06Q 10/06316
See application file for complete search history.

(56) References Cited

U.S. PATENT DOCUMENTS

| | | | |
|---|---|---|---|
| 2004/0034562 A1* | 2/2004 | Shuto ................. | G06Q 30/0207 705/14.1 |
| 2015/0170439 A1* | 6/2015 | Chen ...................... | G07C 5/008 701/31.4 |
| 2016/0155098 A1* | 6/2016 | McElhinney ......... | G06F 11/263 705/305 |

FOREIGN PATENT DOCUMENTS

| | | | |
|---|---|---|---|
| CN | 107248249 A | * | 10/2017 |
| JP | 2001249988 A | * | 9/2001 |
| JP | 2005293099 A | | 10/2005 |

(Continued)

OTHER PUBLICATIONS

S.C.Hui, "Data Mining for Customer Service Support", 2000, Information & Management 38 (2000), pp. 1-13. (Year: 2000).*

(Continued)

*Primary Examiner* — Tan D Nguyen
(74) *Attorney, Agent, or Firm* — Kim & Stewart LLP

(57) ABSTRACT

According to an embodiment, an information processing apparatus includes a communication interface, a shop database, a maintenance worker database, and a controller. The controller determines a degree of influence of a failure on a shop on the basis of failure information received by the communication interface and shop information stored in the shop database. The controller compares the determined degree of influence with a degree of influence in other shop and determines the priority of a response to the failure in the shop. The controller selects an appropriate maintenance worker from maintenance workers stored in the maintenance worker database on the basis of the determined priority.

9 Claims, 9 Drawing Sheets

(56) References Cited

FOREIGN PATENT DOCUMENTS

JP      2018026011 A  *  2/2018
JP      2019215828 A  *  12/2019

OTHER PUBLICATIONS

P. Van der Perre, Common protocols and APIs for the remote installation, operation, upgrading and removal of automotive services, 2006, 1st International Conference on Communications and Networking in China, abstract. (Year: 2006).*
Umut Ozertem, "Learning to Suggest: A Machine Learning Framework for Ranking Query Suggestions", 2012, SIGIR' 12, Aug. 12-16, 2012, pp. 25-34. (Year: 2012).*
Cynthia Swank, "The Lean Service Machine," 2003, Operation Management, pp. 1-12, (Year: 2003).*

* cited by examiner

| SHOP NAME SECTION | NUMBER-OF-TER-MINALS SECTION | NUMBER-OF-CUS-TOMERS SECTION | AMOUNT-OF-MONEY SECTION | FAILURE INFOR-MATION SECTION |
|---|---|---|---|---|
| A | TWO | 200 / 10 | 3000 YEN | |
| B | FIVE | 400 / 8 | 5000 YEN | |

Fig.5

| | 7421 | 7422 | 7423 | 7424 | 7425 |
|---|---|---|---|---|---|
| | MAINTENANCE WORKER SECTION | MAINTENANCE WORK "a" SECTION | MAINTENANCE WORK "b" SECTION | MAINTENANCE WORK "c" SECTION | LOCATION SECTION |
| | X | GOOD | ACCEPTABLE | ACCEPTABLE | WITHIN COMPANY |
| | Y | ACCEPTABLE | GOOD | EXCELLENT | WITHIN COMPANY |
| | Z | EXCELLENT | ACCEPTABLE | ACCEPTABLE | AT CUSTOMER'S PLACE |

MAINTENANCE WORK "a" SECTION : SKILL WITH RESPECT TO POS FAILURE
MAINTENANCE WORK "b" SECTION : SKILL WITH RESPECT TO SCANNER FAILURE
MAINTENANCE WORK "c" SECTION : SKILL WITH RESPECT TO PRINTER FAILURE

Fig.6

INFORMATION PROCESSING APPARATUS AND INFORMATION PROCESSING METHOD OF INFORMATION PROCESSING APPARATUS

CROSS-REFERENCE TO RELATED APPLICATION

This application is based upon and claims the benefit of priority from the prior Japanese Patent Application No. 2020-053069, filed on Mar. 24, 2020, the entire contents of which are incorporated herein by reference.

FIELD

Embodiments described herein generally relate to an information processing apparatus and an information processing method of the information processing apparatus.

BACKGROUND

For example, in a shop such as a supermarket or a convenience store, when a failure occurs, e.g., a POS (Point of Sales) terminal for selling products in the shop and a device connected to the POS terminal are malfunctioned, an employee of the shop contacts a maintenance company in charge of maintenance of these devices. The maintenance company that receives the contact dispatches a maintenance worker to the shop to repair the failed devices.

The maintenance company grasps skills of the maintenance workers with respect to the failure, and when the maintenance worker is dispatched, the maintenance worker with high skill with respect to the failure is dispatched.

However, since an influence of an occurrence of the failure on the shop differs depending on the situation, for example, it is desirable to select an appropriate maintenance worker depending on the influence on the shop.

BRIEF DESCRIPTION OF THE DRAWINGS

FIG. 5 is a memory map showing a configuration of a shop DB according to the embodiment.

FIG. 6 is a memory map showing a configuration of a maintenance worker DB according to the embodiment.

DETAILED DESCRIPTION

Figure 1:
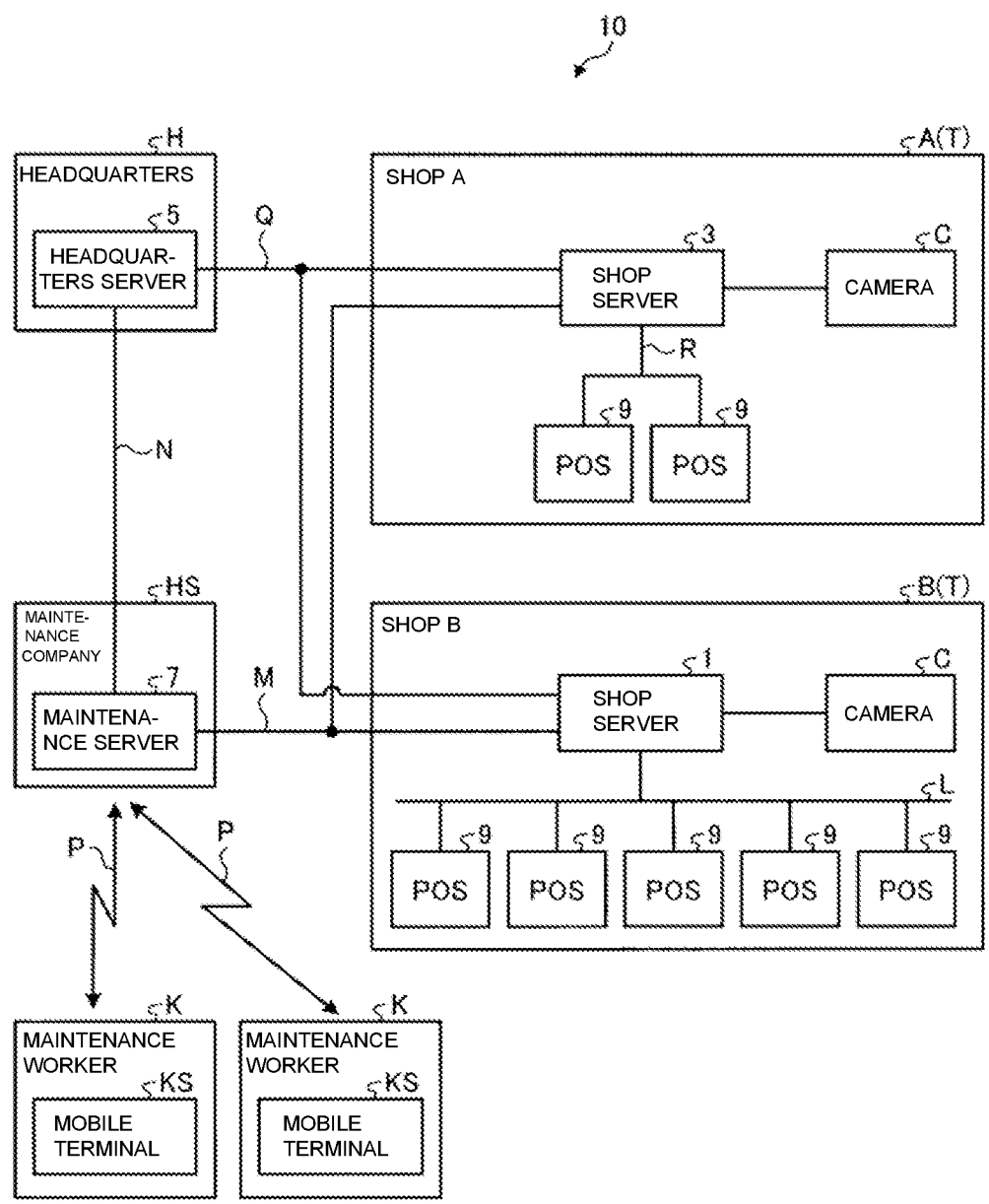
FIG. 1 is an explanatory diagram including a system according to an embodiment.

According to one embodiment, an information processing apparatus controls information of maintenance workers who repair a failure of devices on the basis of failure information of the devices in a plurality of shops. The information processing apparatus includes a communication interface, a shop database, a maintenance worker database, and a controller. The communication interface receives the failure information from the shops. The failure information includes occurrence information indicating that the failure occurs in the devices and scale information indicating a scale of the failure. The shop database stores shop information of the number of visited customers to the shops and sales of the shops for each shop. The maintenance worker database stores skill levels of the maintenance workers for each maintenance worker. The controller determines that the failure information is received by the communication interface. The controller determines a degree of influence of the failure on the shop on the basis of the scale information included in the failure information and the shop information stored in the shop database. The controller compares the determined degree of influence with a degree of influence in other shop and determines the priority of a response to the failure in the shop. Furthermore, the controller selects an appropriate maintenance worker from the maintenance workers stored in the maintenance worker database on the basis of the determined priority.

Embodiments will be described below with reference to the drawings. The same reference symbols in the drawings will denote the same or similar portions. In the embodiment, a maintenance server will be described as an example of an information processing apparatus. In the embodiment, a POS terminal, and a printer and a scanner connected to the POS terminal will be described as examples of devices used for sale of products in a shop and in which a failure may occur. The embodiment is not limited to the following description.

FIG. 1 is a diagram showing a system 10 of an embodiment including shop servers and maintenance servers. As shown in FIG. 1, the system 10 includes shop servers 1 and 3 placed in shops T, a headquarters server 5 placed in a headquarters H of a company that operates the shops, and a maintenance server 7 placed in a maintenance company HS. In the embodiment, the shops T operated by the headquarters H are described as two shops A and B, but the headquarters H can operate two or more shops. The maintenance server 7 of the maintenance company HS may be connected to the headquarters server 5 of one or more companies.

As shown in FIG. 1, the shop A has two POS terminals 9 and one shop server 3. The two POS terminals 9 are electrically connected to the shop server 3, for example, by a LAN (Local Area Network) R.

The POS terminal 9 performs sales data processing and settlement processing of products to be sold in the shop. The sales data processing includes processing of reading out product information (product name, product price, etc.) relating to the product, for example, from a product master 142 of the shop server, on the basis of a code symbol (for example, product code or two-dimensional code) attached to the product read by a scanner 91 (see FIG. 2). The sales data processing includes processing of displaying the product information of a display section (not shown). Furthermore, the sales data processing includes processing of storing the product information in the POS terminal 9. The settlement processing includes processing of displaying settlement information such as a total price and change information related to a transaction on the basis of the stored product information, and issuing a receipt in which the product information and the settlement information are printed by a printer 92 (see FIG. 2).

Figure 2:
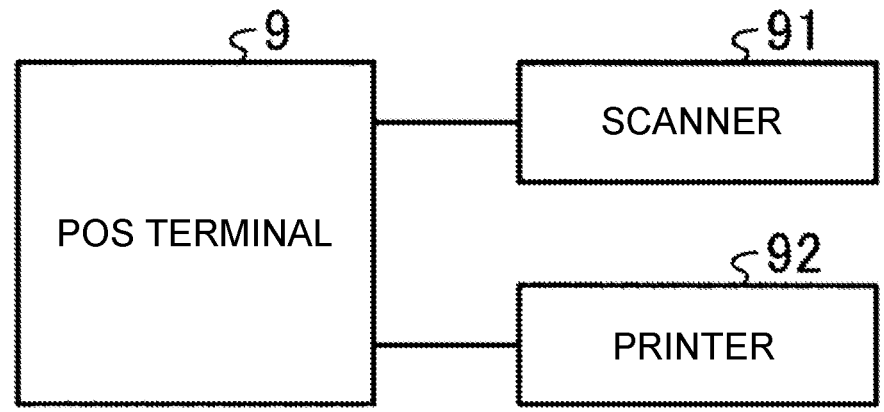
FIG. 2 is a diagram showing a connection between a POS terminal and peripheral devices according to the embodiment.

The POS terminal 9 is connected to the scanner 91 and the printer 92 as peripheral devices. FIG. 2 is a diagram showing the connection between the POS terminal 9, the scanner 91, and the printer 92. As shown in FIG. 2, the POS terminal 9 connects the scanner 91 and the printer 92. The scanner 91 images or optically reads the code symbol attached to the product. The POS terminal 9 acquires the product code that specifies the product on the basis of the symbol read by the scanner 91. The printer 92 prints the product information and the settlement information (hereinafter collectively referred to as "transaction information") relating to the transaction received from the POS terminal 9 on a receipt sheet and issues a receipt.

The POS terminal 9 has a known self-diagnosis function, and determines a failure such as a malfunction occurred in the POS terminal 9. The failure of the POS terminal 9 includes, for example, a failure that makes it impossible to display the product information and/or the settlement information. The POS terminal 9 receives the failure such as the malfunction occurred in the scanner 91 and the printer 92 from the scanner 91 and/or the printer 92. The failure of the scanner 91 includes, for example, the malfunction that the code symbol cannot be read. The failure of the printer 92 includes, for example, the malfunction that prevents printing on the receipt sheet. The POS terminal 9 transmits error information such as the malfunction occurred in the POS terminal 9 itself, the failure occurred in the scanner 91 and/or the printer 92 connected to the POS terminal 9, and the like to the shop server 3 as the failure occurred in the POS terminal 9.

The shop server 3 collects the transaction information relating to the product transacted by the POS terminal 9 for each transaction. The shop server 3 transmits the transaction information collected from each POS terminal 9 to the headquarters server 5 at a predetermined time, for example, when the shop is closed once a day.

As shown in FIG. 1, the shop server 3 is connected to a camera C or cameras C placed at one or a plurality of locations of the shop A. The camera C captures an image of a customer in the shop A. The shop server 3 grasps the number of customers on the basis of the image captured by the camera C. For example, the shop server 3 determines the number of human faces from the captured image using a known face determination function, and calculates the number of customers.

Furthermore, the shop server 3 receives and collects the error information of the failure occurred in the POS terminal 9 (including malfunction occurred in scanner 91 and printer 92) from the POS terminal 9. The shop server 3 creates the failure information including the type and the number of the device that fails on the basis of the error information. The shop server 3 transmits the created failure information to the maintenance server 7 via a communication line M such as a public line. At the same time, the shop server 3 also transmits the number of customers calculated on the basis of the image captured by the camera C. Incidentally, the shop server 3 also transmits the failure information and the number of customers transmitted to the maintenance server 7 to the headquarters server 5 via a communication line Q such as the public line.

The shop B has five POS terminals 9 and the shop server 1. The five POS terminals 9 are electrically connected to the shop server 1 by, for example, a LAN (Local Area Network) L. The shop server 1 is connected to the camera C or cameras C placed at one or a plurality of locations of the shop B.

The POS terminal 9, the shop server 1, and the camera(s) C placed in the shop B have the same configurations and functions as those of the POS terminal 9, the shop server 3, and the camera(s) C placed in the shop A. Therefore, descriptions of the POS terminal 9, the shop server 1, and the camera(s) C placed in the shop B are substituted with descriptions of the POS terminal 9, the shop server 3, and the camera(s) C placed in the shop A, and are omitted.

The head office server 5 totalizes and stores the transaction information received from the shop server 3 of the shop A and the shop server 1 of the shop B. In addition, the headquarters server 5 periodically transmits the transaction information including the number of transactions for a predetermined period of time, e.g., one day, for each shop to the maintenance server 7 via the communication line N such as the public line. The number of transactions can be regarded as the number of visited customers.

The maintenance server 7 receives the transaction information including the number of transactions for each shop T from the headquarters server 5. The maintenance server 7 updates the shop information for each shop T stored in a stored shop DB (database) 743 (see FIG. 4) on the basis of the received transaction information. The shop information is information that characterizes a sales situation in the shop T stored for each shop T. The shop DB 743 and the shop information will be described later with reference to FIG. 5.

The maintenance server 7 also includes a maintenance worker DB (database) 742 that stores skills of the maintenance workers K working in the maintenance company. The skills of the maintenance workers K are, for example, evaluations with respect to a technical strength to repair and a speed of repair. The maintenance server 7 stores the skills of the maintenance workers K working at the maintenance company in the maintenance worker DB 742 on the basis of a type of a repaired device and an experience value. The maintenance worker DB 742 will be described later with reference to FIG. 6.

In addition, in a case where the maintenance server 7 receives a request for repair of the device from the plurality of shops T, the maintenance server 7 determines a priority to dispatch the maintenance worker K for each shop T on the basis of a degree of influence in the shop T in which the failure occurs. The maintenance server 7 determines the maintenance worker K to be dispatched to each shop T on the basis of the skill of the maintenance worker K and the like stored in the maintenance worker DB 742. The determination of the maintenance worker K by the maintenance server 7 will be described later with reference to FIGS. 8 and 9.

Furthermore, the maintenance server 7 transmits information including an instruction to dispatch to the shop T via a communication line P such as a public wireless line to a mobile terminal KS (e.g., portable device including microcomputer such as handy terminal, smartphone, mobile phone, or PDA (Personal Digital Assistant)) carried by the determined one or a plurality of maintenance workers K.

Figure 3:
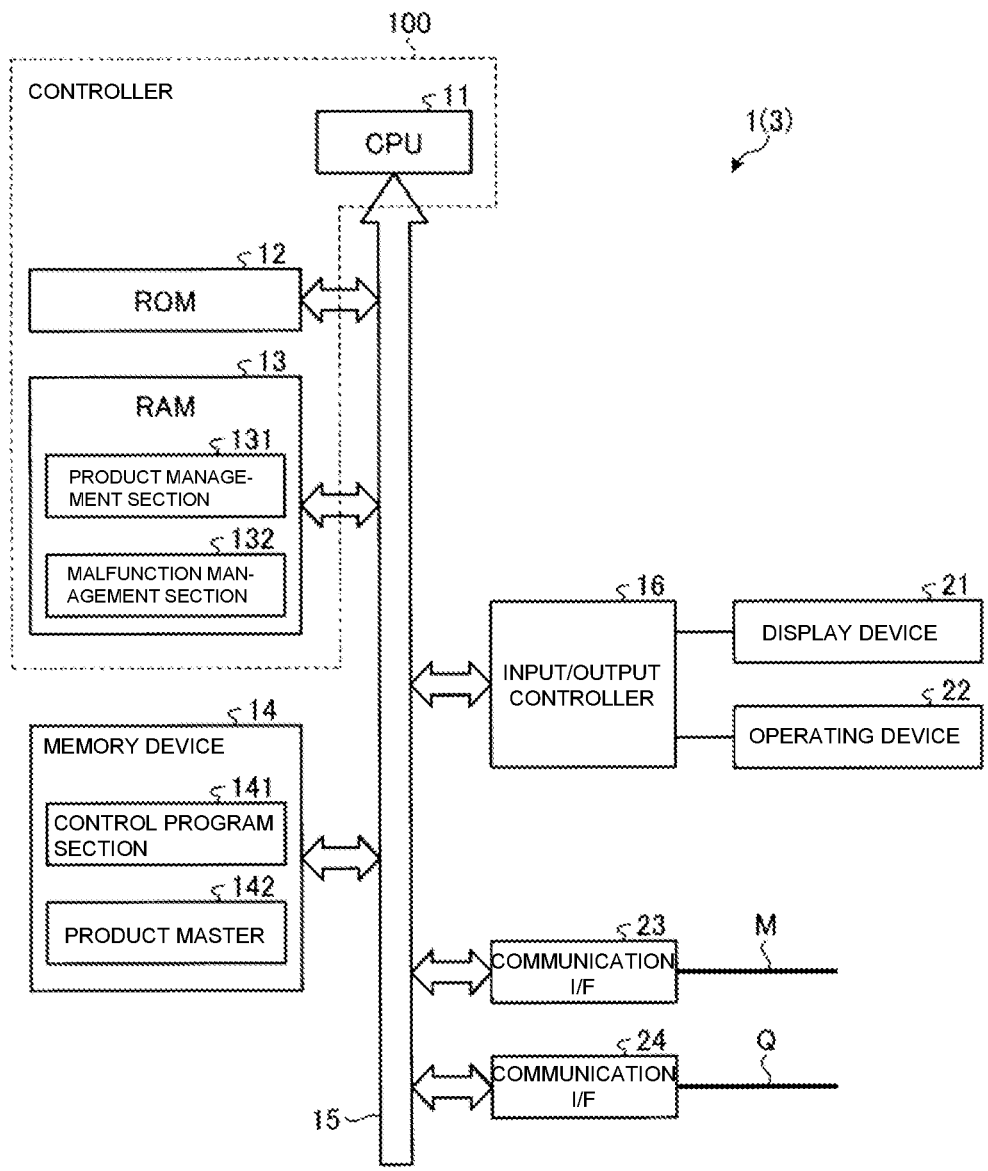
FIG. 3 is a block diagram showing a hardware configuration of a shop server according to the embodiment.

Next, a hardware configuration of the shop server 1 according to the embodiment will be described. Since the shop server 3 has the same hardware configuration as the shop server 1, the configuration of the shop server 1 will be described here as a representative. As shown in FIG. 3, the shop server 1 includes a controller 100, a memory device 14, and the like. The controller 100 includes a central processing unit (CPU) 11, a read only memory (ROM) 12, and a random access memory (RAM) 13. The CPU 11 performs control. The ROM 12 stores various programs. The RAM 13 is used to expand the programs and various types of data. The memory device 14 stores various programs. The CPU 11, the ROM 12, the RAM 13, and the memory device 14 are connected to each other via a bus 15. The controller 100 executes control processing of the shop server 1 described later by operating the CPU 11 in accordance with a control program stored in the ROM 12 or the memory device 14 and expanded in the RAM 13.

As shown in FIG. 3, the RAM 13 includes a product management section 131 and a malfunction management section 132. The product management section 131 stores for each POS terminal 9 the product information and the settlement information received from the POS terminal 9. In addition, the product management section 131 stores the sales information of the shop B obtained by totalizing the product information and the settlement information received from five POS terminals 9 placed in the shop B.

The malfunction management section 132 stores the failure occurred in the POS terminal 9 for each POS terminal 9. In addition, the malfunction management section 132 stores the failure occurred in the devices connected to the POS terminal 9 (in this embodiment, scanner 91 and printer 92) for each device. That is, the malfunction management section 132 stores which POS terminal 9 fails and that the failure occurs in the POS terminal 9 or the connected device. In a case where the malfunction management section 132 stores the failure of, for example, a certain POS terminal 9, the malfunction management section 132 stores the failure so as to present a location in which the failure occurred in the POS terminal 9. For example, the malfunction management section 132 stores the failure so as to present whether the failure occurred is a failure of a display device 21 or a failure of an operating device 22. The malfunction management section 132 stores the failures of the connected devices (scanner 91 and printer 92) so as to present the position in which the failures occurred.

The memory device 14 includes a hard disk drive (Hard Disc Drive), a flash memory, and the like, and maintains stored content even when a power supply is cut off. The memory device 14 includes a control program section 141 and a product master 142. The control program section 141 stores a control program for controlling the shop server 1. The product master 142 stores the product information corresponding to the product code for specifying the product for all products to be sold in the shop B. The shop server 1 periodically (for example, once a day) transmits content stored in the product master 142 to each POS terminal 9 placed in the shop B.

The controller 100 is connected to the display device 21 and an operating device 22 via the bus 15 and an input/output controller 16. The display device 21 includes an LED (Light Emitting Diode), for example, and displays information and the like to an operator who operates the shop server 1. The operating device 22 includes a keyboard for operation by the operator.

The controller 100 is connected to a communication I/F (interface) 23 and a communication I/F 24 via the bus 15. The communication I/F 23 is connected to the maintenance server 7 via the communication line M, and transmits and receives information to and from the maintenance server 7. The communication I/F 24 is connected to the headquarters server 5 via the communication line Q, and transmits and receives information to and from the headquarters server 5.

Figure 4:
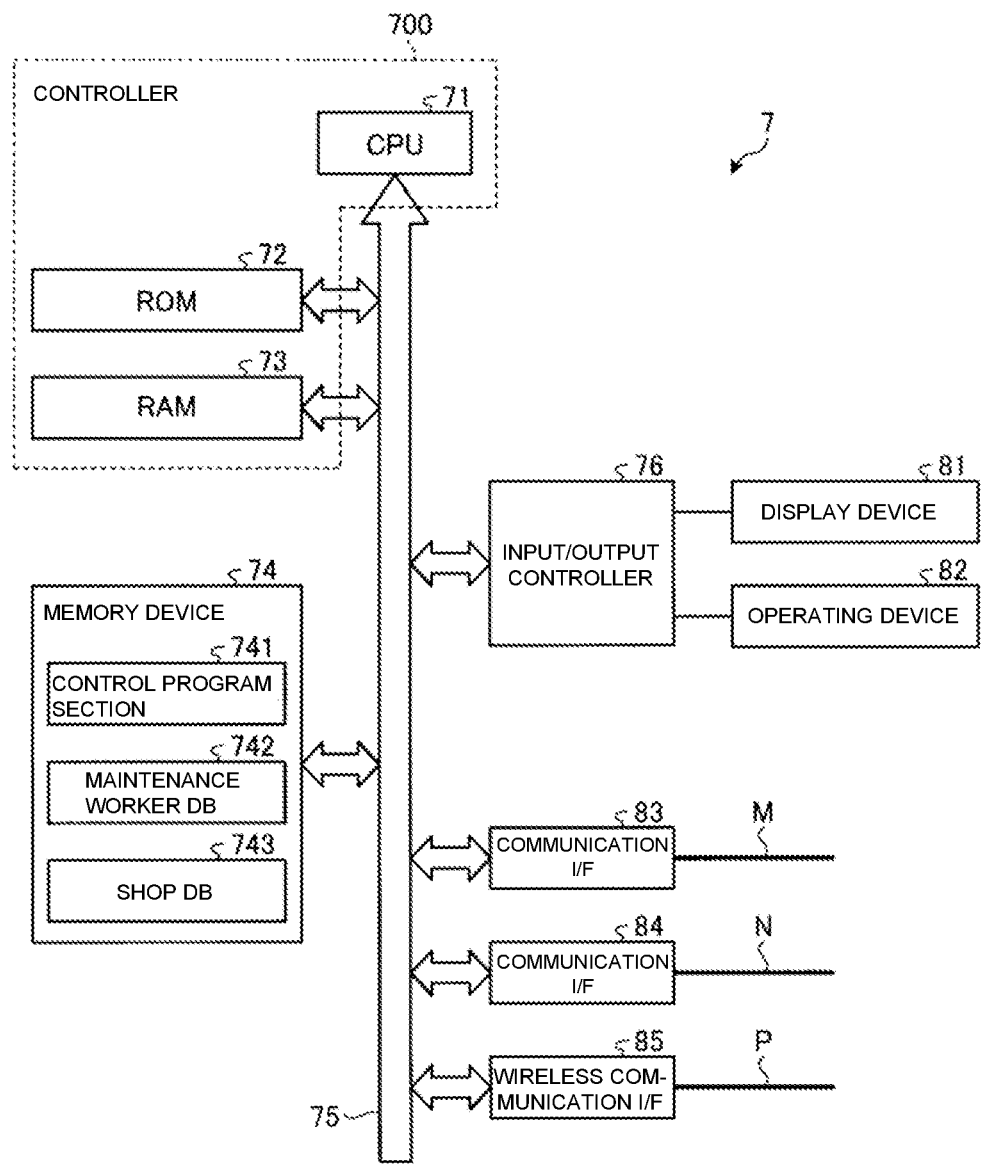
FIG. 4 is a block diagram showing a hardware configuration of a maintenance server according to the embodiment.

Next, a hardware configuration of the maintenance server 7 according to the embodiment will be described. As shown in FIG. 4, the maintenance server 7 includes a controller 700, a memory device 74, and the like. The controller 700 include a CPU 71, a ROM 72, and a RAM 73. The CPU 71 performs control. The ROM 72 stores various programs. The RAM 73 is used to expand the programs and various types of data. The memory device 74 stores various programs. The CPU 71, the ROM 72, the RAM 73, and the memory device 74 are connected to each other via a bus 75. That is, the controller 700 executes control processing of the maintenance server 7 described later by operating the CPU 71 in accordance with the control program stored in the ROM 72 or the memory device 74 and expanded in the RAM 73.

The memory device 74 includes an HDD, a flash memory, and the like, and maintains stored content even when the power supply is cut off. The memory device 74 includes a control program section 741, the maintenance worker DB 742, and a shop DB 743. The maintenance worker DB 742 stores the skills of the maintenance workers K for each maintenance worker K. The maintenance worker DB 742 will be described later with reference to FIG. 6. The shop DB 743 stores shop data of the shops. The shop DB 743 will be described later with reference to FIG. 5.

The controller 700 is connected to the display device 81 and the operating device 82 via the bus 75 and the input/output controller 76. The display device 81 includes, for example, the LED, and displays information and the like to an operator who operates the maintenance server 7. The operating device 82 includes a keyboard for operation by the operator.

The controller 700 is connected to a communication I/F 83, a communication I/F 84, and a wireless communication I/F 85 via the bus 75. The communication I/F 83 is connectable to the shop server 1 and the shop server 3 via the communication line M, and transmits and receives information to and from the shop server 1 and the shop server 3. The communication I/F 84 is connectable to the headquarters server 5 via the communication line N, and transmits and receives information to and from the headquarters server 5. The wireless communication I/F 85 is connectable to the mobile terminal KS carried by each maintenance worker K via the communication line P, and transmits and receives information to and from each mobile terminals KS.

Next, the shop DB 743 will be described. FIG. 5 is a memory map showing a configuration of the shop DB 743. The shop DB 743 stores shop information for each shop. The shop information includes the number of the POS terminals 9 placed in the shop, an average number of customers (number of transactions) per day in the shop and the number of customers per unit time processed by one POS terminal 9, an average amount of money for one customer to purchase the product in one transaction, an average number of customers per day in the shop in the past day, the information of the failure occurred in the past, and the like.

As shown in FIG. 5, the shop DB 743 includes a shop name section 7431, a number-of-terminals section 7432, a number-of-customers section 7433, an amount-of-money section 7434, and a failure information section 7435. The shop name section 7431 stores a shop name, a shop code, and the like for specifying the shop. The number-of-terminals section 7432 stores the number of the POS terminals 9 placed in the shop. The controller 700 periodically receives the information of the number of the POS terminals 9 placed in the shop from the headquarters server 5, and updates the information stored in the number-of-terminals section 7432. In the example of FIG. 5, the number of the POS terminals 9 placed in the shop A is two. The number of the POS terminals 9 placed in the shop B is five.

The number-of-customers section 7433 stores the number of customers per day in the shop and the number of customers per unit time processed by one POS terminal 9 in association with the shop name stored in the shop name section 7431. The number of customers per day in a shop corresponds to the number of transactions per day. The number of customers per unit time processed by one POS terminal 9 is determined by the controller 700 on the basis of the number of transactions received from the headquarters server 5. That is, the controller 700 determines the number of customers per unit time (e.g., one hour) processed by one POS terminal 9 by dividing the number of transactions per day of the shop received from the headquarters server 5 by the number of POS terminals 9 placed in the shop.

The amount-of-money section 7434 stores the average amount of money that a single customer purchases the product in a single transaction in association with the shop name stored by the shop name section 7431. The average amount of money is calculated by the controller 700 on the basis of the number of transactions received from the headquarters server 5 and the transaction amount included in the transaction information. The failure information section 7435 stores information of the failure occurred in the shop in the past (type of failure and date and time when failure occurred) in association with the shop name stored in the shop name section 7431.

Next, the maintenance worker DB 742 will be described. The maintenance worker DB 742 stores the skills of all maintenance workers K belonging to the maintenance company for each maintenance worker K depending on types of maintenance works related to the failure. Here, the maintenance worker K is, for example, an employee of the maintenance company or a maintenance worker contracted with the maintenance company. The maintenance work is, for example, a repair work. As described above, the skills of the maintenance workers K are evaluations with respect to the technical strength to repair and the speed of repair. In the embodiment, the maintenance worker DB 742 will be described by exemplifying works relating to three kinds of failures (maintenance work "a", maintenance work "b", and maintenance work "c"). The maintenance work "a" is an operation related to maintenance with respect to a failure of the POS terminal 9. The maintenance work "b" is an operation related to maintenance with respect to a failure of the scanner 91. The maintenance work "c" is a maintenance operation related to maintenance with respect to a failure of the printer 92.

As shown in FIG. 6, the maintenance worker DB 742 includes a maintenance worker section 7421, a maintenance work "a" section 7422, a maintenance work "b" section 7423, a maintenance work "c" section 7424, and a location section 7425. The maintenance worker section 7421 stores a maintenance worker code or a maintenance worker name for specifying the maintenance worker K. The maintenance work "a" section 7422 stores the skill of the maintenance worker K with respect to the maintenance work "a" in association with the maintenance worker code stored in the maintenance worker section 7421. The maintenance work "b" section 7423 stores the skill of the maintenance worker K with respect to the maintenance work "b" in association with the maintenance worker code stored in the maintenance worker section 7421. The maintenance work "c" section 7424 stores the skill of the maintenance worker K with respect to the maintenance work "c" in association with the maintenance worker code stored in the maintenance worker section 7421. The place section 7425 stores information of the current location of the maintenance worker K (maintenance worker K's whereabouts) and information on the future time required for repair, in association with the maintenance worker code stored in the maintenance worker section 7421. The information of the current location of the maintenance worker K (information of whereabouts) is, for example, information indicating whether the maintenance worker K is within the company or at a customer's place. The skills in FIG. 6 are shown as three grades of "excellent", "good" and "acceptable". The skill "excellent" indicates that the skill is excellent, i.e., the skill level is high. The skill "good" indicates that the skill is normal, i.e., the level of skill is ordinal. The skill "acceptable" indicates that the skill is poor, i.e., the skill level is low. The information stored in the customer engineer DB 742 is successively updated to the most recent state.

In the case of FIG. 6, the maintenance worker DB 742 stores information of three maintenance workers K. A maintenance worker X has the "good" skill for the maintenance work "a", the "good" skill for the maintenance work "b", and the "good" skill for the maintenance work "c". The whereabouts of the maintenance worker X is "within company". The whereabouts "within company" indicates that the maintenance worker X is located at a service office, for example. A maintenance worker Y has the "acceptable" skill for the maintenance work "a", the "good" skill for the maintenance work "b", and the "excellent" skill for maintenance work "c". The whereabouts of the maintenance worker Y is "within company". A maintenance worker Z has the "excellent" skill for the maintenance work "a", the "acceptable" skill for the maintenance work "b", and the "acceptable" skill for the maintenance work "c". The whereabouts of the maintenance worker X is "at customer's place". The whereabouts of the maintenance worker X is "at customer's place". The whereabouts of "at customer's place" indicates that the maintenance worker X is present at the customer's place.

Figure 7:
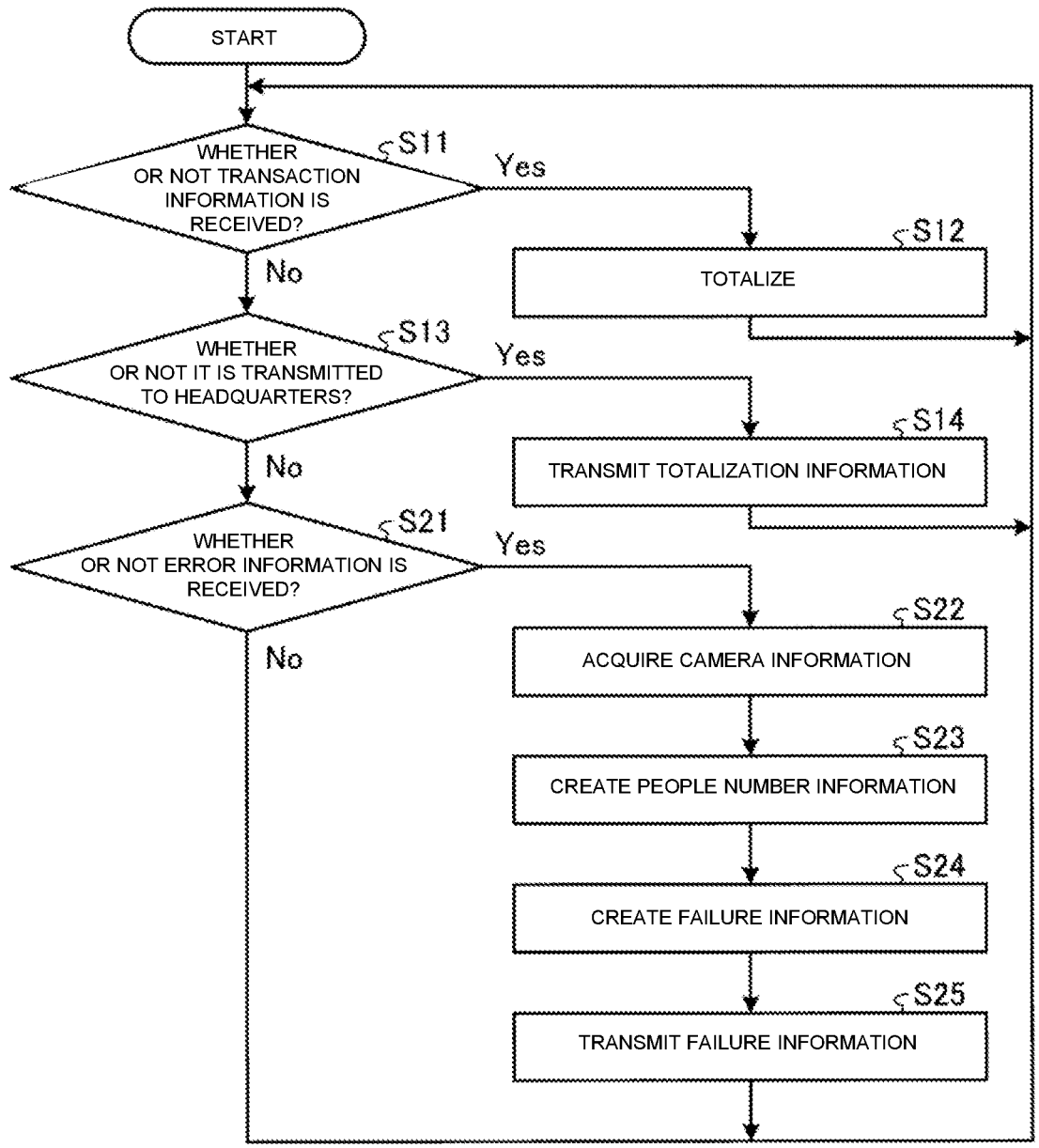
FIG. 7 is a flowchart showing control processing of the shop server according to the embodiment.

Next, the control of the shop server 1 will be described. Incidentally, since the shop server 3 performs the similar control, the control of the shop server 1 will be described here as a representative. As shown in FIG. 7, in Step S11, the controller 100 of the shop server 1 determines whether or not the transaction information is received from the POS terminal 9. If it is determined that the transaction information is received from the POS terminal 9 (Yes in Step S11), the processing of the controller 100 proceeds to Step S12. In Step S12, the controller 100 adds the transaction information to totalization information stored in the product management section 131 and totalizes the totalization information. Then, the processing of the controller 100 returns to Step S11.

If it is determined that the transaction information from the POS terminal 9 is received (No in Step S11), for example, if it is determined that a reception from the POS terminal 9 is not the transaction information, the processing of the controller proceeds to Step S13. In Step S13, the controller 100 determines whether or not it is a timing to transmit the totalization information to the headquarters server 5. If it is determined that it is the timing to transmit the totalized information to the headquarters server 5 (Yes in Step S13), the processing of the controller 100 proceeds to Step S14. In Step S14, the controller 100 transmits the totalization information stored in the product management section 131 to the headquarters server 5. Then, the controller 100 returns to Step S11.

If it is determined that it is not the timing to transmit the totalized information to the headquarters server 5 (No in Step S13), the processing of the controller proceeds to Step S21. In Step S21, the controller 100 determines whether or not the error information is received from the POS terminal 9. Here, the error information is information of an error generated in the POS terminal 9, the scanner 91 or the printer 92 connected to the POS terminal 9. If it is determined that the error information is received from the POS terminal 9 (Yes in Step S21), the processing of the controller proceeds to Step S22. In Step S22, the controller 100 acquires image capturing information acquired by capturing an image of the inside of the shop by the camera C at the point in time. Next, in Step S23, the controller 100 creates people number information at the present point in time in the shop on the basis of the information of the customer included in the acquired image capturing information. Then, in Step S24, the controller 100 creates the failure information including the error information, the people number information, and the type of the device that failed (i.e., type of failure) and the number of the devices information (i.e., scale of failure). In Step S25, the controller 100 transmits the created failure information to the maintenance server 7. At this time, the controller 100 also transmits the failure information transmitted to the maintenance server 7 to the headquarters server 5. Then, the processing of the controller 100 returns to Step S11. Incidentally, the shop server 3 also executes the processing of S11 to S25. Then, the processing of the controller 100 returns to Step S11. If it is determined that the error information is not received from the POS terminal 9 (Yes in Step S21), for example, if it is determined that the reception from the POS terminal 9 is not a reception of the error information, the processing of the controller 100 returns to Step S11.

Such a shop server 1 and such a shop server 3, if the failure occurs in its own POS terminal 9 or/and in the scanner 91 and the printer 92 connected to its own POS terminal 9, create the failure information of the device in which the failure occurs and transmit the failure information to the maintenance server 7.

Figure 8:
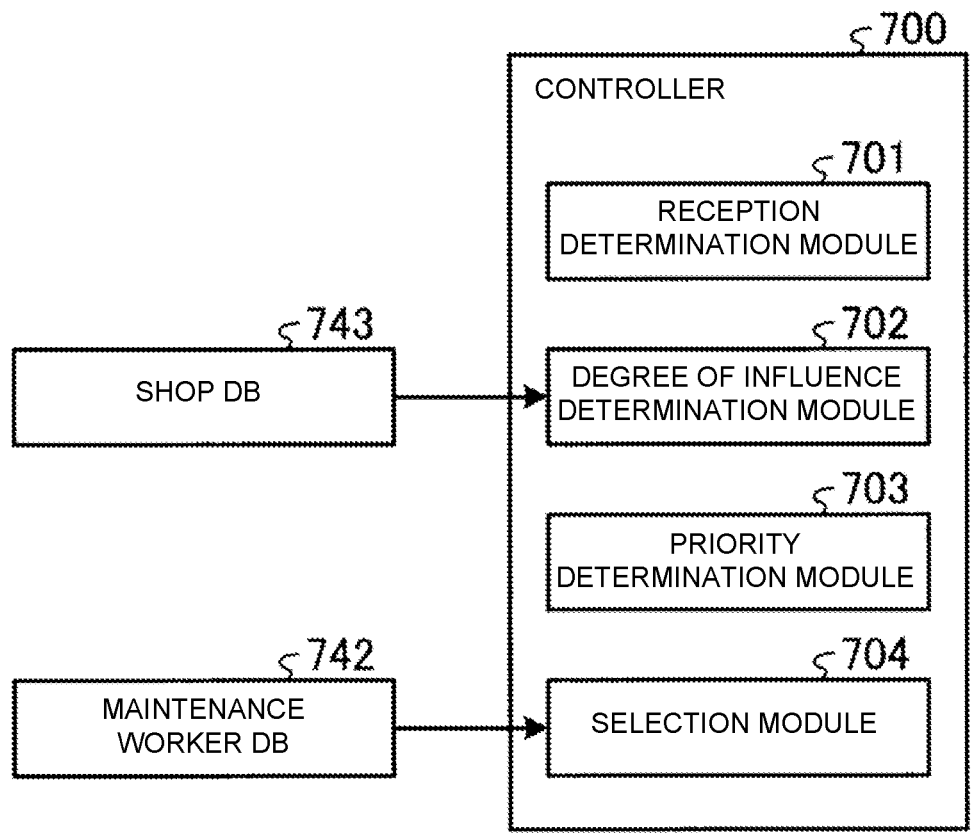
FIG. 8 is a functional block diagram showing a functional configuration of the maintenance server according to the embodiment.

Next, a functional configuration of the maintenance server 7 will be described. FIG. 8 is a functional block diagram showing a functional configuration of the maintenance server 7. The controller 700 of the maintenance server 7 functions as a reception determination module 701, a degree of influence determination module 702, a priority determination module 703, and a selection module 704 in accordance with the control program stored in the ROM 72 or the memory device 74 and expanded in the RAM 73.

The reception determination module 701 determines whether or not the failure information is received. Here, the failure information includes the failure information indicating that the failure occurred in the device placed in the shop, and the failure information indicating the type of the failure and the scale of the failure. The failure information indicating the type of failure is the information indicating whether or not the failure occurs in any of the POS terminal 9, the scanner 91, or the printer 92. The failure information indicating the scale of the failure includes, for example, the number of the devices information indicating the number of devices in which the failure occurs, the people number information created in Step S23 described above, and the like. Specifically, the reception determination module 701 determines whether or not the communication I/F 83 receives from the shop server 1 or the shop server 3, as the failure information, the information indicating that the failure occurs, the information of the type of failure indicating which of the POS terminal 9, the scanner 91, and the printer 92 is failed, the number of devices information indicating the number of failed devices, the people number information created in Step S23, and the like.

When the failure information is received by the reception determination module 701, the degree of influence determination module 702 determines the degree of influence of the failure on the shop on the basis of the shop information stored in the shop DB 743. Specifically, the degree of influence determination module 702 determines the degree of influence of the failure on the shop on the basis of the information of the number of devices in which the failure occurs and the people number information included in the received failure information, and the shop information. More specifically, the degree of influence determination module 702 may, for example, 1. from the above-mentioned information of the number of devices and the number of POS terminals 9 stored in the number-of-terminals section 7432, it is determined how many POS terminals 9 among the number of POS terminals 9 placed in the shop failed (scale of failure), and 2. from the number of customers per unit time corresponding to one POS terminal 9 stored in the number-of-customers section 7433 and the average amount of money for purchasing the product by one customer stored in the amount-of-money section 7434 in one transaction, a money amount of an opportunity loss in the POS terminal 9 in which the failure occurs is determined. The money amount of the opportunity loss is the amount of money damaged by the occurrence of the failure.

As described above, the degree of influence determination module 702 determines the degree of influence (whether influence is large or small) due to the occurrence of the failure in the shop on the basis of the scale of the POS terminal 9 in which the failure occurs and the money amount of the opportunity loss due to the occurrence of the failure.

The degree of influence determination module 702 may determine the degree of influence due to the occurrence of the failure in the shop by further adding a degree of congestion in the shop at the time of the failure from the number of customers and the people number information stored in the number-of-customers section 7433. In this case, the communication interface receives information of the number of customers based on shooting information in the shop from the shop servers 1 and 3. The controller 700 acquires information of the number of customers at the time of the failure from the people number information received by the communication interface. The controller 700 determines the degree of congestion of the customers in the shop on the basis of the acquired people number information and the people number information stored in the number-of-customers section 7433 of the shop database 743. In this case, if the failure occurs in a state where the shop is congested, there is a possibility that the money amount of the opportunity loss becomes larger, and therefore, the degree of influence determination module 702 may determine the degree of influence due to the occurrence of the failure in the shop to be higher if the degree of congestion of the shop is high.

In addition, the degree of influence determination module 702 may determine the degree of influence on the basis of the type of the failure occurred based on the failure information (on which device in which failure occurs). For example, if the failure occurs in the scanner 91, since a product registration operation can be performed using the operating device 22 in place of the scanner 91, the degree of influence determination module 702 may determine that the degree of influence caused by the failure occurred in the shop is small. If the failure occurs in the POS terminal 9 or the printer 92, since there is no alternative means, the degree of influence determination module 702 may determine that the degree of influence due to the occurrence of the failure in the shop is high.

The priority determination module 703 compares the degree of influence determined by the degree of influence determination module 702 with the degree of influence in other shop, and determines a priority of maintenance in the shop. Specifically, the priority determination module 703 determines which of the degrees of influence determined by the degree of influence determination module 702 is higher than the degree of influence caused by the failure of the device currently occurring in other shop. The priority determination module 703 determines that the failure of the shop having the higher degree of influence has a high priority for maintenance.

In addition to the degree of influence, the priority determination module 703 determines the priority in consideration of a past occurrence frequency of the same type of failure in the shop. Specifically, the priority determination module 703 determines the past occurrence frequency of the same type of failure in the shop on the basis of the past occurrence status of the failure stored in the failure information section 7435. The priority determination module 703 may determine the priority of the shop slightly higher than that of other shops in a case where many similar failures occurred in the past or in a case where similar failures occurred most recently.

In addition to the degree of influence, the priority determination module 703 may determine the priority of the shop slightly higher than that of other shops if it takes time for the maintenance worker K to arrive at the shop because the shop in which the failure occurs is distant or the like.

The selection module 704 selects an appropriate maintenance worker K from the maintenance workers K stored in the maintenance worker DB 742 on the basis of the priority determined by the priority determination module 703. Specifically, if the priority determined by the priority determination module 703 is high, the selection module 704 selects the high-skilled maintenance worker K from the maintenance workers K stored in the maintenance worker DB 742. More specifically, the selection module 704 selects, in accordance with the type of the failure occurred, the high-skilled maintenance worker K for the type. In addition, the selection module 704 selects an appropriate number of maintenance workers K depending on the scale of the failure occurred.

It should be noted that the selection module 704 selects one high-skilled maintenance worker (maintenance worker with "excellent" skill) at the shop with high priority. On the other hand, if the scale of the failure in the shop is large (e.g., there are many POS terminals 9 in which failure occurs in one shop), the selection module 704 selects a plurality of maintenance workers K. In this case, the selection module 704 selects a plurality of maintenance workers whose skills are not so high (skills are "good").

The selection module 704 may select the maintenance worker K on the basis of the information of the location section 7425 in consideration of whether the maintenance worker K is waiting in the company or in the service office or is going to the customer. For example, if the maintenance worker K is located near the shop in which the failure occurs, the selection module 704 may select the maintenance worker K.

Figure 9:
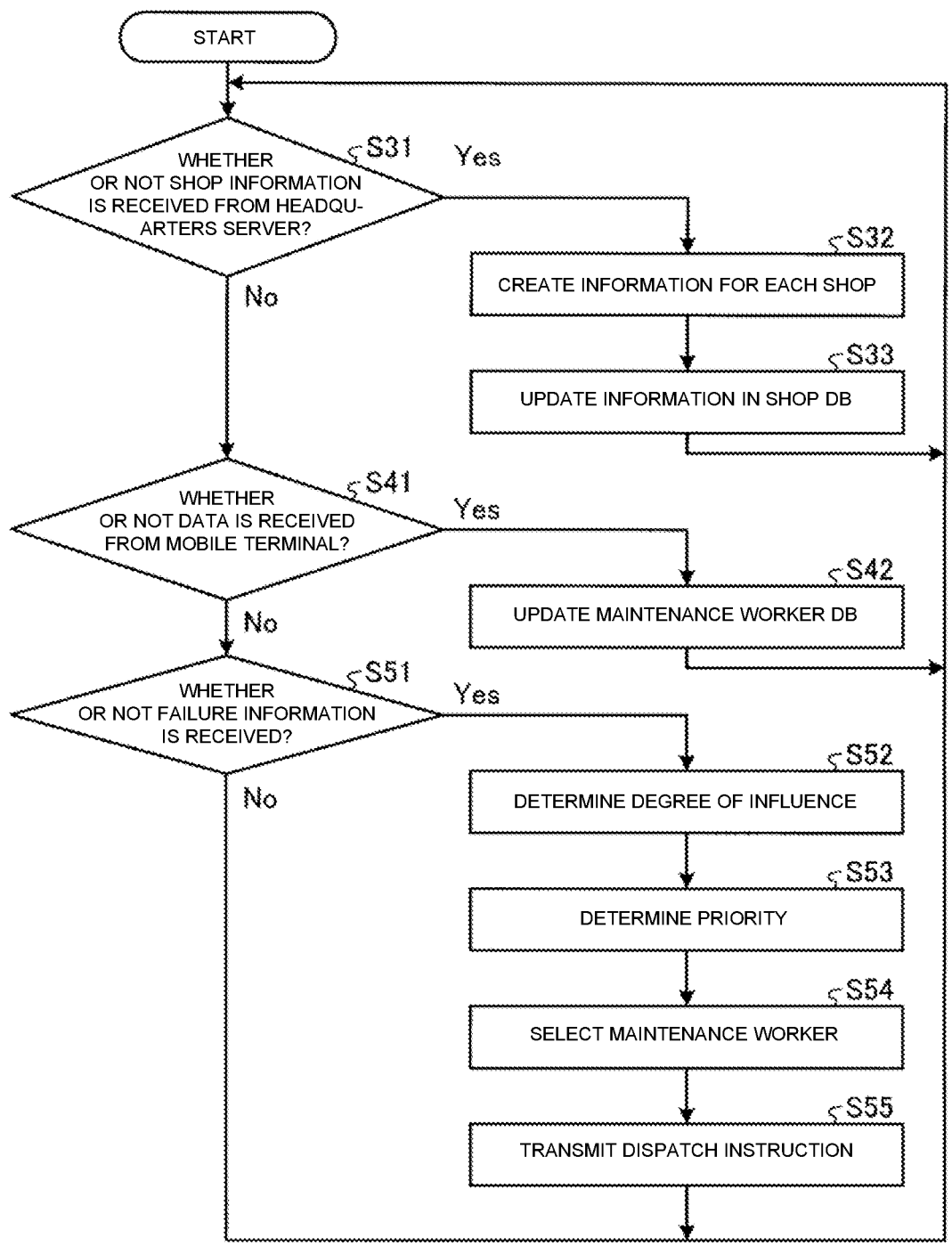
FIG. 9 is a flowchart showing control processing of the maintenance server according to the embodiment.

Next, the control of the maintenance server 7 will be described. FIG. 9 is a flowchart showing the control processing of the maintenance server 7. As shown in FIG. 9, in Step S31, the controller 700 of the maintenance server 7 determines whether or not the shop information is received from the headquarters server 5. If it is determined that the shop information is received from the head office server 5 (Yes in Step S31), the processing of the controller 700 proceeds to Step S32. On the basis of the received shop information, the controller 700 creates information to be stored in the shop DB 743. That is, on the basis of the received shop information, the controller 700 creates information to be stored in the number-of-customers section 7433, information to be stored in the amount-of-money section 7434, and the like in association with the shop name or the shop code stored in the shop name section 7431. In Step S33, the controller 700 adds the information created in Step S32 to the shop DB 743 and updates the information stored in the shop DB 743. Then, the processing of the controller 700 returns to Step S31.

If it is determined that the shop information from the head office server 5 is not received (No in Step S31), for example, if it is determined that the reception from the head office server 5 is not the reception of the shop information, the processing of the controller 700 proceeds to Step S41. In Step S41, the controller 700 determines whether or not the information is received from the mobile terminal KS carried by the maintenance worker K. From the mobile terminal KS carried by the maintenance worker K, information about an arrival at a shop in which a failure occurs, a time required for repair, a time until completion of repair in the case of repair, and the like is received with respect to the device to be repaired. If it is determined that the information is received from the mobile terminal KS (Yes in Step S41), the processing of the controller 700 proceeds to Step S42. In Step S42, the controller 700 updates the information stored in the location section 7425 of the maintenance worker DB 742 to the latest information. Then, the processing of the controller 700 returns to Step S31.

If it is determined that the information from the mobile terminal KS of the maintenance worker K is not received (No in Step S41), for example, if it is determined that the received information is not the information from the mobile terminal KS of the maintenance worker K, the processing of the controller proceeds to Step S51. In Step S51, the reception determination module 701 of the controller 700 determines whether or not the failure information is received from the shop server 1 or the shop server 3. If it is determined that the failure information is received from the shop server 1 or the shop server 3 (Yes in Step S51), the processing of the controller 700 proceeds to Step S52. In Step S52, on the basis of the received failure information and the shop information stored in the shop DB 743, the degree of influence determination module 702 of the controller 700 determines the degree of influence of the failure on the shop. Then, in Step S53, the priority determination module 703 of the controller 700 determines which of the shops has a high priority for maintenance on the basis of the degree of influence of the failure determined by the degree of influence determination section 702 and the degree of influence of the failure occurred in the other shop. Then, in Step S54, on the basis of the priority determined by the priority determining section 703, the selecting module 704 of the controller 700 selects a required maintenance worker K from the maintenance worker K stored in the maintenance worker DB 742. In Step S55, the controller 700 transmits a dispatch instruction to notify the mobile terminal KS carried by the selected maintenance worker K of dispatch for repair of the device. Then, the processing of the controller 700 returns to Step S31. Furthermore, if it is determined that the failure information from the shop server 1 or the shop server 3 is not received (No in Step S51), for example, if it is determined that the reception from the shop server 1 or the shop server 3 is not the reception of the failure information, the controller 700 returns to Step S31.

According to such an embodiment, the maintenance server 7 can dispatch an appropriate maintenance worker K depending on the degree of influence on the shop when a failure occurs in the device.

As described above, the maintenance server 7 according to the embodiment has the shop DB 743. The shop DB 743 stores the number of devices placed in the shop and the shop information related to the number of visited customers and sales at the shop for each shop. The maintenance server 7 according to the embodiment includes the controller 700 functioning as the reception determination module 701. The reception determination module 701 of the controller 700 determines whether the failure information indicating that the failure occurs in the device placed in the shop and the scale of the failure is received. In addition, the maintenance server 7 according to the embodiment includes the controller 700 functioning as the degree of influence determination module 702. When the failure information is received by the reception determination module 701, the degree of influence determination module 702 of the controller 700 determines the degree of influence of the failure on the shop on the basis of the shop information stored in the shop DB 743. The maintenance server 7 according to the embodiment includes the controller 700 functioning as the priority determination module 703. The priority determination module 703 of the controller 700 compares the degree of influence determined by the degree of influence determination module 702 with the degree of influence in other shop, and determines the priority of maintenance in the shop. The maintenance server 7 according to the embodiment includes the maintenance worker DB 742. The maintenance worker DB 742 stores the skills of the maintenance workers K for repairing the failure of the device for each maintenance worker K. Furthermore, the maintenance server 7 according to the embodiment includes the controller 700 functioning as the selection module 704. The selection module 704 of the controller 700 selects an appropriate maintenance worker K from the maintenance workers K stored in the maintenance worker DB 742 on the basis of the priority determined by the priority determination module 703.

The degree of influence determination module 702 of the controller 700 can determine more accurately the degree of influence by determining the degree of influence in consideration of the congestion degree of the customers in the shop.

In addition, the degree of influence determination module 702 of the controller 700 can determine more accurately the degree of influence by determining the degree of influence in consideration of the type of the failure occurred.

In addition, the priority determination module 703 of the controller 700 can determine more accurately the priority by determining the priority in consideration of the past occurrence frequency of the same type of failure in the shop.

The priority determination module 703 of the controller 700 can select the number of maintenance workers K to be dispatched depending on the received scale of the failure, thereby selecting the number of maintenance workers K depending on the scale of the failure.

In this embodiment, the maintenance server 7 includes the shop DB 743 and the maintenance worker DB 742. However, it is not limited to this and a device other than the maintenance server 7 may include the shop DB 743 and the maintenance worker DB 742.

The embodiment is described using two shop servers 1 and 3. However, the number of the shop servers is not limited to this, and the number of the shop servers may be two or more.

The embodiment is described using one headquarters server 5. However, it is not limited to this, and two or more headquarters servers 5 may be connected to the maintenance server 7. In this case, one or more shop servers may be connected to each headquarters server 5.

In addition, in the embodiment, the number of transactions with the customers is regarded as the number of visited customers. However, it is not limited to this, and for example, the number of customers actually visited the shop is counted and may be regarded as the number of customers who have visited the shop, or the number of visited customers or the number of customers acquired using other methods may be regarded as the number of visited customers.

Furthermore, in the embodiment, the POS terminal 9, the scanner 91, and the printer 92 are described as examples of devices that may cause a failure and be used for sale of products in a shop. However, it is not limited to this, and the devices that may cause the failure and be used for sale of the products in the shop may be other devices connected to the POS terminal 9, the shop server 1, the shop server 3, or the like.

The program executed by the maintenance server 7 according to the embodiment is provided by storing in a computer-readable recording medium such as a CD-ROM, a flexible disk (FD), a CD-R and a DVD (Digital Versatile Disc) in an installable format or an executable format.

Furthermore, the program executed by the maintenance server 7 according to the embodiment may be configured to be provided by storing in a computer connected to a network such as the Internet and downloading via the network. The program executed by the maintenance server 7 according to the embodiment may be configured to be provided or distributed via the network such as the Internet.

In addition, the program executed by the maintenance server 7 according to the embodiment may be configured to be provided by building into the ROM or the like in advance.

While certain embodiments have been described, these embodiments have been presented by way of example only, and are not intended to limit the scope of the inventions. Indeed, the novel methods and systems described herein may be embodied in a variety of the other forms; furthermore, various omissions, substitutions and changes in the form the methods and systems described herein may be made without departing from the spirit of the inventions. The accompanying claims and their equivalents are intended to cover such forms or modifications as would fall within the scope and spirit of the inventions.

What is claimed is:

1. An information processing method for an information processing apparatus that controls information of maintenance workers who repair a failure of devices on a basis of failure information of the devices in a plurality of shops, comprising:

storing shop information related to sales of the shops for each shop in a shop database, the shop information including, with respect to each shop, information of the number of visited customers to the shop and information of a spent amount per visited customer;

storing skill levels of the maintenance workers with respect to each of a plurality of types of failures for each maintenance worker in a maintenance worker database;

receiving the failure information by a communication interface from a shop, the failure information including occurrence information indicating that the failure occurs in one or more of devices in the shop, type information indicating a type of the failure, and scale information indicating a scale of the failure;

determining a degree of influence of the failure on sales of the shop on a basis of the scale information included in the received failure information, and the visited customer information and the spent amount information included in the shop information of the shop stored in the shop database;

comparing the determined degree of influence on the sales of the shop with a degree of influence of another failure on sales of another shop and determining a priority of a response to the failure in the shop based on the comparison, and selecting an appropriate maintenance worker from the maintenance workers stored in the maintenance worker database on a basis of the determined priority and the type information included in the received failure information.

2. An information processing apparatus that controls information of maintenance workers who repair a failure of devices on a basis of failure information of the devices in a plurality of shops, comprising:

a communication interface that receives the failure information from a shop, the failure information including occurrence information indicating that the failure occurs in one or more of devices in the shop, type information indicating a type of the failure, and scale information indicating a scale of the failure;

a shop database that stores shop information related to sales of the shops for each shop, the shop information including, with respect to each shop, visited customer information indicating the number of visited customers to the shop and spent amount information indicating a spent amount per visited customer;

a maintenance worker database that stores skill levels of the maintenance workers with respect to each of a plurality of types of failures for each maintenance worker; and a controller that determines that the failure information is received by the communication interface, determines a degree of influence of the failure on sales of the shop on a basis of the scale information included in the received failure information, and the visited customer information and the spent amount information included in the shop information of the shop stored in the shop database, compares the determined degree of influence on the sales of the shop with a degree of influence of another failure on sales of another shop and determines a priority of a response to the failure in the shop based on the comparison, and selects an appropriate maintenance worker from the maintenance workers stored in the maintenance worker database on a basis of the determined priority and the type information included in the received failure information.

3. The information processing apparatus according to claim 2, wherein the scale information includes information of the number of failed devices in which the failure occurs, the shop information stored in the shop database also includes, with respect to each of the shops, information of the number of devices placed in the shop, and the controller determines the degree of influence of the failure on the sales of the shop on a basis of the information of the number of failed devices and the information of the number of devices placed.

4. The information processing apparatus according to claim 2, wherein the controller determines the degree of influence on the sales of the shop further in consideration of a degree of congestion of customers in the shop.

5. The information processing apparatus according to claim 4, wherein the communication interface further receives on-site customer count information of the number of customers based on image data of an image captured in the shop, the shop information stored in the shop database also includes, with respect to each of the shops, statistic customer count information of the number of customers in the shop for one day, and the controller acquires information of the number of customers at the time of the failure from the on-site customer count information received by the communication interface, and determines the degree of congestion of customers in the shop on a basis of the acquired on-site customer count information and the statistic customer count information stored in the shop database.

6. The information processing apparatus according to claim 2, wherein the type of the failure indicated by the type information includes a type of a failed device among a plurality of types of devices.

7. The information processing apparatus according to claim 2, wherein the controller determines the priority further in consideration of a past occurrence frequency of the same type of failure in the shop.

8. The information processing apparatus according to claim 7, wherein the shop database stores a past occurrence status of the failure, and the controller determines the past occurrence frequency of the same type of failure in the shop on a basis of the past occurrence status of the failure stored in the shop database.

9. The information processing apparatus according to claim 2, wherein the controller selects the number of maintenance workers to be dispatched to the shop depending on the received scale of the failure shown by the scale information received by the communication interface.

* * * * *